United States Patent
Tanuma

(10) Patent No.: US 8,202,570 B2
(45) Date of Patent: Jun. 19, 2012

(54) PROCESS FOR PRODUCING MEMBRANE/ELECTRODE ASSEMBLY FOR POLYMER ELECTROLYTE FUEL CELL AND PROCESS FOR PRODUCING POLYMER ELECTROLYTE FUEL CELL

(75) Inventor: Toshihiro Tanuma, Chiyoda-ku (JP)

(73) Assignees: Asahi Glass Company, Limited, Tokyo (JP); Panasonic Corporation, Kadoma-shi (JP)

( * ) Notice: Subject to any disclaimer, the term of this patent is extended or adjusted under 35 U.S.C. 154(b) by 410 days.

(21) Appl. No.: 12/512,122

(22) Filed: Jul. 30, 2009

(65) Prior Publication Data

US 2010/0003400 A1    Jan. 7, 2010

Related U.S. Application Data

(63) Continuation of application No. PCT/JP2008/051567, filed on Jan. 31, 2008.

(30) Foreign Application Priority Data

Feb. 2, 2007    (JP) .................................. 2007-024420

(51) Int. Cl.
*B05D 5/12* (2006.01)
(52) U.S. Cl. ....................................................... 427/115
(58) Field of Classification Search .................. 427/115; 429/40, 42, 482, 535
See application file for complete search history.

(56) References Cited

U.S. PATENT DOCUMENTS

| 7,718,292 B2 * | 5/2010 | Takekawa ..................... 429/468 |
| 2002/0144394 A1 * | 10/2002 | Uchida et al. ................ 29/623.5 |
| 2003/0077503 A1 * | 4/2003 | Yoshitake et al. .............. 429/42 |
| 2005/0008920 A1 * | 1/2005 | Kohyama et al. ............... 429/34 |

(Continued)

FOREIGN PATENT DOCUMENTS

JP    11-031515    2/1999

(Continued)

OTHER PUBLICATIONS

U.S. Appl. No. 12/641,690, filed Dec. 18, 2009, Tanuma.

(Continued)

*Primary Examiner* — Brian K Talbot
(74) *Attorney, Agent, or Firm* — Oblon, Spivak, McClelland, Maier & Neustadt, L.L.P.

(57) ABSTRACT

Provided are a process for producing a membrane/electrode assembly for a polymer electrolyte fuel cell and a process for producing a polymer electrolyte fuel cell, capable of achieving a high output voltage in a wide current density range.

At least one of an anode and a cathode in a membrane/electrode assembly for a polymer electrolyte fuel cell is formed through a catalyst layer forming step of applying a first coating fluid containing a catalyst and an ion exchange resin, onto a substrate to form a catalyst layer; a gas diffusion layer forming step of applying a second coating fluid containing carbon fibers and an ion exchange resin, onto the catalyst layer to form a gas diffusion layer to serve as an outermost layer of the membrane/electrode assembly for the polymer electrolyte fuel cell; and a peeling step of peeling the substrate off from the catalyst layer. The membrane/electrode assembly for the polymer electrolyte fuel cell is disposed between two separators each having a gas channel formed on a surface thereof so that surfaces of the outermost layers are adjacent to the respective separators, whereby the gas diffusion layer is adjacent to the separator.

13 Claims, 1 Drawing Sheet

U.S. PATENT DOCUMENTS

2008/0223516 A1  9/2008  Tanuma

FOREIGN PATENT DOCUMENTS

| JP | 2001-283864 | 10/2001 |
| JP | 2003-109629 | 4/2003 |
| JP | 2003-173789 | 6/2003 |
| JP | 2003-317727 | 11/2003 |
| JP | 2006-331717 | * 12/2006 |
| JP | 2006-339124 | 12/2006 |
| JP | 2007-012424 | 1/2007 |

OTHER PUBLICATIONS

U.S. Appl. No. 12/859,304, field Aug. 19, 2010, Tanuma.
U.S. Appl. No. 12/910,935, filed Oct. 25, 2010, Tanuma.

* cited by examiner

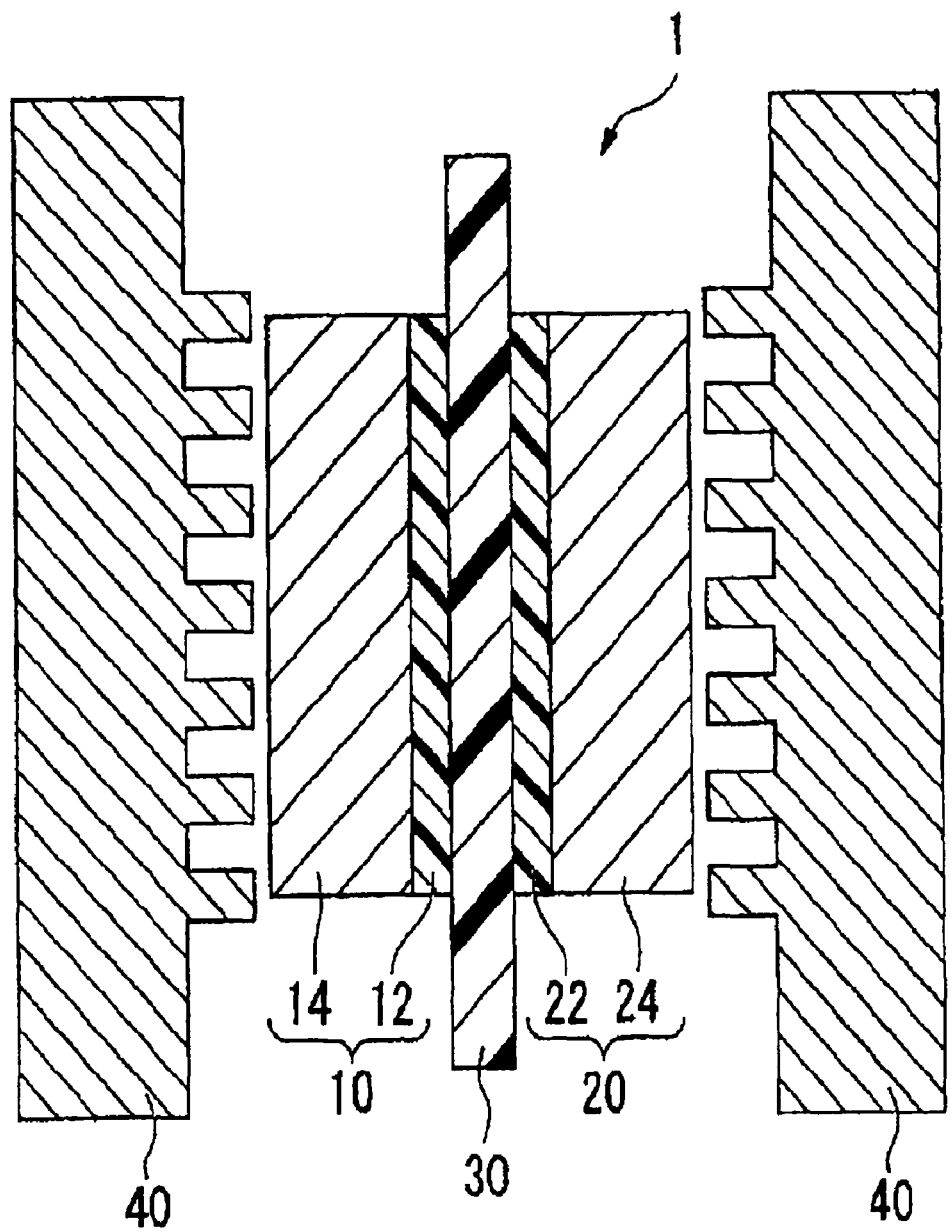

PROCESS FOR PRODUCING MEMBRANE/ELECTRODE ASSEMBLY FOR POLYMER ELECTROLYTE FUEL CELL AND PROCESS FOR PRODUCING POLYMER ELECTROLYTE FUEL CELL

TECHNICAL FIELD

The present invention relates to a process for producing a membrane/electrode assembly for a polymer electrolyte fuel cell and a process for producing a polymer electrolyte fuel cell.

BACKGROUND ART

Attention has been drawn to fuel cells using hydrogen and oxygen, as a power generating system which presents substantially no adverse effects on the global environment because in principle, its reaction product is water only. Among them, in recent years, a polymer electrolyte fuel cell using a proton conducting ion exchange membrane (polymer electrolyte membrane) as an electrolyte is expected to be useful for in-vehicle power sources, since its operation temperature is low, its output density is high and it can be downsized.

The polymer electrolyte fuel cell comprises a membrane/electrode assembly having electrodes (an anode (fuel electrode) and a cathode (air electrode)) disposed on both sides of a polymer electrolyte membrane; and separators having a gas channel formed on a surface thereof. Each electrode is normally composed of a catalyst layer in contact with the polymer electrolyte membrane and a gas diffusion layer disposed outside the catalyst layer. The gas diffusion layer plays a role in diffusing air or fuel in the electrode and a role in discharging water produced in the electrode.

The polymer electrolyte fuel cell is generally produced by disposing the membrane/electrode assembly between two separators to form a cell and stacking plural cells.

The polymer electrolyte fuel cell is characterized in that its operation temperature is low (from 50 to 120° C.) as mentioned above. On the other hand, however, it has a difficulty such that exhaust heat can hardly be utilized effectively for e.g. an auxiliary power. In order to offset such a difficulty, the polymer electrolyte fuel cell is required to have a high performance in utilization of hydrogen and oxygen, i.e. high energy efficiency and high output power density.

In order that the polymer electrolyte fuel cell satisfies the above requirement, the membrane/electrode assembly is particularly important among elements constituting the polymer electrolyte fuel cell.

Heretofore, the catalyst layer of the electrode is prepared from a viscous mixture obtained in such a manner that a catalyst powder for facilitating an electrode reaction and an ion exchange resin for increasing conductivity and preventing clogging (flooding) of a porous body due to condensation of water vapor are dissolved or dispersed in an alcohol solvent such as ethanol.

Processes for producing the membrane/electrode assembly are, for example, the following processes (1) to (3).

(1) A process comprising the steps of: forming catalyst layers by directly applying the above-mentioned viscous mixture onto surfaces of a polymer electrolyte membrane or, transferring or bonding catalyst layers obtained by applying the mixture onto separate sheet substrates, onto surfaces of the polymer electrolyte membrane, thereby to obtain a laminate of the catalyst layer/polymer electrolyte membrane/catalyst layer; and disposing a gas diffusion layer of a porous conductive material such as carbon paper or carbon cloth on each of two sides of the laminate.

(2) A process comprising the steps of: forming a laminate of a catalyst layer and a gas diffusion layer by directly applying the above-mentioned viscous mixture onto the gas diffusion layer to form the catalyst layer; and disposing the laminate on each of two sides of the polymer electrolyte membrane so that the catalyst layer is adjacent to the polymer electrolyte membrane.

(3) A process comprising the steps of: forming each catalyst layer by applying the above-mentioned viscous mixture onto a substrate; forming an electrode by laminating carbon paper or the like directly onto the catalyst layer by hot pressing; and bonding the electrode on each of two sides of the polymer electrolyte membrane by hot pressing or the like (for example, cf. Patent Document 1).

Patent Document 1: JP-A-2001-283864

DISCLOSURE OF THE INVENTION

Object to be Accomplished by the Invention

However, the membrane/electrode assemblies obtained by the conventional processes are not necessarily satisfactory in properties such as the gas diffusion property, electrical conductivity, water repellency and durability of the electrodes. For example, the membrane/electrode assembly obtained by the above process (1) has a problem that adhesion between the gas diffusion layer and the catalyst layer is insufficient. Furthermore, the membrane/electrode assembly obtained by the above process (2) has a problem that pores of the gas diffusion layer are clogged in forming the catalyst layer, for example, to deteriorate the gas diffusion property. Moreover, the membrane/electrode assembly obtained by the above process (3) has a problem that the catalyst and gas diffusion layers are deformed by pressure in hot pressing, for example, to deteriorate the gas diffusion property. In addition, these processes also have a problem of production cost because materials used for the gas diffusion layer are expensive.

Furthermore, the conventional polymer electrolyte fuel cells using such membrane/electrode assemblies fail to have sufficiently satisfactory properties, and, especially, it is difficult to obtain a high output voltage in a wide current density range.

It is an object of the present invention to provide a process for producing a membrane/electrode assembly for a polymer electrolyte fuel cell and a process for producing a polymer electrolyte fuel cell, which is capable of obtaining a high output voltage in a wide current density range.

Means to Accomplish the Object

The present invention has solved the above problems and has the following aspects.

1. A process for producing a membrane/electrode assembly for a polymer electrolyte fuel cell, the assembly comprising an anode and a cathode each having a catalyst layer containing a catalyst and an ion exchange resin, and an electrolyte membrane containing a proton-conducing polymer and disposed between the catalyst layer of the anode and the catalyst layer of the cathode, and the assembly being intended to be disposed between two separators each having a gas channel formed on a surface thereof so that surfaces of outermost layers are adjacent to the respective separators, thereby to constitute the polymer electrolyte fuel cell, the process comprising forming at least one of the anode and the cathode through the following steps:

a catalyst layer forming step of applying a first coating fluid containing the catalyst and the ion exchange resin, onto a substrate to form the catalyst layer;

a gas diffusion layer forming step of applying a second coating fluid containing carbon fibers and an ion exchange resin, onto the catalyst layer to form a gas diffusion layer to serve as the outermost layer of the membrane/electrode assembly for the polymer electrolyte fuel cell; and a peeling step of peeling the substrate off from the catalyst layer.

2. The process for producing the membrane/electrode assembly for the polymer electrolyte fuel cell according to the above aspect 1, wherein the second coating fluid contains the carbon fibers and the ion exchange resin in a mass ratio of the carbon fibers:the ion exchange resin=from 1:0.03 to 1:1.0.

3. The process for producing the membrane/electrode assembly for the polymer electrolyte fuel cell according to the above aspect 1 or 2, wherein the gas diffusion layer is so formed as to have a thickness of from 30 to 400 μm.

4. The process for producing the membrane/electrode assembly for the polymer electrolyte fuel cell according to any one of the above aspects 1 to 3, wherein the second coating fluid further contains polytetrafluoroethylene in an amount of from 1 to 30% of a mass of the carbon fibers.

5. The process for producing the membrane/electrode assembly for the polymer electrolyte fuel cell according to any one of the above aspects 1 to 4, wherein the carbon fibers have a fiber diameter of from 0.1 to 50 μm.

6. The process for producing the membrane/electrode assembly for the polymer electrolyte fuel cell according to any one of the above aspects 1 to 5, wherein both of the anode and the cathode are formed through the catalyst layer forming step, the gas diffusion layer forming step and the peeling step, and wherein the electrolyte membrane is disposed and bonded between the catalyst layer of the anode and the catalyst layer of the cathode.

7. A process for producing a polymer electrolyte fuel cell in which a membrane/electrode assembly comprising an anode and a cathode each having a catalyst layer containing a catalyst and an ion exchange resin, and an electrolyte membrane containing a proton-conducing polymer and disposed between the catalyst layer of the anode and the catalyst layer of the cathode is disposed between two separators each having a gas channel formed on a surface thereof so that surfaces of outermost layers are adjacent to the respective separators, the process comprising forming the membrane/electrode assembly by the process as defined in any one of the above aspects 1 to 6, and disposing the gas diffusion layer formed in the gas diffusion layer forming step, so as to be adjacent to the separator.

Effect of the Invention

The present invention makes it feasible to produce the membrane/electrode assembly for the polymer electrolyte fuel cell and the polymer electrolyte fuel cell capable of achieving a high output voltage in a wide current density range.

BRIEF DESCRIPTION OF DRAWING

FIG. 1 is a schematic cross-sectional drawing to show an example of the membrane/electrode assembly in the polymer electrolyte fuel cell.

MEANINGS OF SYMBOLS

1: membrane/electrode assembly, 10: anode, 12: catalyst layer, 14: gas diffusion layer, 20: cathode, 22: catalyst layer, 24: gas diffusion layer, 30: electrolyte membrane, 40: separators.

BEST MODE FOR CARRYING OUT THE INVENTION

Process for Producing Membrane/Electrode Assembly for Polymer Electrolyte Fuel Cell A membrane/electrode assembly for a polymer electrolyte fuel cell (which is also referred to hereinafter as a "membrane/electrode assembly") produced by the process for producing the membrane/electrode assembly for the polymer electrolyte fuel cell according to the present invention (which is also referred to hereinafter as "assembly production process of the present invention") comprises an anode and a cathode each having a catalyst layer containing a catalyst and an ion exchange resin, and an electrolyte membrane containing a proton-conducting polymer and disposed between the catalyst layer of the anode and the catalyst layer of the cathode.

The membrane/electrode assembly is disposed between two separators each having a gas channel formed on a surface thereof, to constitute the polymer electrolyte fuel cell. Here, the membrane/electrode assembly is disposed so that surfaces of the outermost layers thereof (, which are surfaces of the anode and cathode not adjacent to the electrolyte membrane) are adjacent to the respective separators.

In the present invention, at least one of the anode and the cathode is formed through the following steps: a catalyst layer forming step of applying a first coating fluid containing a catalyst and an ion exchange resin, onto a substrate to form a catalyst layer; a gas diffusion layer forming step of applying a second coating fluid containing carbon fibers and an ion exchange resin, onto the catalyst layer to form a gas diffusion layer to serve as the outermost layer of the membrane/electrode assembly for the polymer electrolyte fuel cell; and a peeling step of peeling the substrate off from the catalyst layer.

Namely, at least one of the outermost layers on the anode side and cathode side in the membrane/electrode assembly produced by the assembly production process of the present invention is the gas diffusion layer (which is also referred to hereinafter as a "carbon fiber layer") formed by the above gas diffusion layer forming step.

First Embodiment

FIG. 1 is a schematic cross-sectional drawing of the polymer electrolyte fuel cell using the membrane/electrode assembly 1 produced in the present embodiment.

The membrane/electrode assembly 1 is composed of the anode 10, cathode 20 and polymer electrolyte membrane 30 disposed between them. The anode 10 is composed of the catalyst layer 12 and the carbon fiber layer 14, and the catalyst layer 12 is adjacent to the polymer electrolyte membrane 30. The cathode 20 is composed of the catalyst layer 22 and the carbon fiber layer 24, and the catalyst layer 22 is adjacent to the polymer electrolyte membrane 30.

The membrane/electrode assembly 1 is disposed between two separators 40 each having a gas channel formed on a surface thereof to constitute the polymer electrolyte fuel cell. At that time, the carbon fiber layer 14 of the anode 10 and the carbon fiber layer 24 of the cathode 20, which are the outermost layers in the membrane/electrode assembly 1, are adjacent to the respective separators 40.

In the present embodiment, both of the anode 10 and the cathode 20 are formed through the catalyst layer forming step, the gas diffusion layer forming step and the peeling step, and the electrolyte membrane 30 is disposed and bonded between the catalyst layer 12 of the anode 10 and the catalyst layer 22 of the cathode 20, thereby to produce the membrane/electrode assembly 1.

A specific process for producing the membrane/electrode assembly 1 according to the present embodiment may be a process including the following steps (1-1) to (1-3).

Step (1-1): step of forming the anode 10 through the catalyst layer forming step of applying the first coating fluid containing the catalyst and the ion exchange resin, onto the substrate to form the catalyst layer 12; the gas diffusion layer forming step of applying the second coating fluid containing the carbon fibers and the ion exchange resin, onto the catalyst layer 12 to form the carbon fiber layer 14; and the peeling step of peeling the substrate off from the catalyst layer 12.

Step (1-2): step of forming the cathode 20 through the catalyst layer forming step of applying the first coating fluid containing the catalyst and the ion exchange resin, onto the substrate to form the catalyst layer 22; the gas diffusion layer forming step of applying the second coating fluid containing the carbon fibers and the ion exchange resin, onto the catalyst layer 22 to form the carbon fiber layer 24; and the peeling step of peeling the substrate off from the catalyst layer 22.

Step (1-3): step of disposing and bonding the electrolyte membrane 30 between the catalyst layer 12 of the anode 10 and the catalyst layer 22 of the cathode 20.

[Step (1-1) and Step (1-2)]

The catalyst layer forming step, the gas diffusion layer forming step and the peeling step in each of the step (1-1) and step (1-2) are conducted according to procedures described below.

(Catalyst Layer Forming Step)

First, the first coating fluid containing the catalyst and the ion exchange resin is applied onto the substrate and dried, thereby to form the catalyst layer.

The catalyst may be any one of substances that can facilitate an electrode reaction, and can be one of conventional known electrode catalysts.

The catalyst is particularly preferably a metal catalyst composed of fine metal particles of a platinum group metal, an alloy containing the platinum group metal, or the like, or a supported catalyst in which the metal catalyst is supported on a carbon support.

Examples of the platinum group metal include platinum, ruthenium, rhodium, palladium, osmium, iridium, and so on.

The alloy containing the platinum group metal is preferably an alloy of platinum and at least one metal selected from the group consisting of the platinum group metals except for platinum (ruthenium, rhodium, palladium, osmium, iridium), gold, silver, chromium, iron, titanium, manganese, cobalt, nickel, molybdenum, tungsten, aluminum, silicon, zinc and tin. The platinum alloy may contain an intermetallic compound of platinum and the metal alloyed with platinum.

The platinum alloy for the anode is preferably an alloy containing platinum and ruthenium from the viewpoint that an activity of the electrode catalyst is stabilized even with supply of a gas containing carbon monoxide.

The carbon support may be activated carbon, carbon black, or the like.

The specific surface area of the carbon support is preferably at least 200 m²/g. The specific surface area of the carbon support is determined by measuring an amount of nitrogen adsorbed on the carbon surface with a BET specific surface area measuring apparatus.

The amount of the metal catalyst supported in the supported catalyst is preferably from 10 to 70 mass % based on the total mass of the supported catalyst.

The amount of the metal catalyst in the catalyst layer is preferably from 0.01 to 0.5 mg/cm² and more preferably from 0.05 to 0.35 mg/cm² from the viewpoint of the optimum thickness to efficiently conduct the electrode reaction.

The ion exchange resin preferably has an ion exchange capacity of from 0.5 to 2.0 meq/g dry resin and particularly preferably from 0.8 to 1.5 meq/g dry resin from the viewpoint of the electrical conductivity and the gas permeability.

The ion exchange resin may be a fluorinated ion exchange resin, a non-fluorinated ion exchange resin, or the like, and the fluorinated ion exchange resin is preferable from the viewpoint of its excellent durability in use as the fuel cell.

The fluorinated ion exchange resin is preferably a perfluorocarbon polymer having sulfonic acid groups (which may contain an etheric oxygen atom) and particularly preferably a copolymer comprising polymerized units based on tetrafluoroethylene and polymerized units based on perfluorovinyl ether having a sulfonic acid group. Such a copolymer is usually obtained by copolymerizing tetrafluoroethylene and perfluorovinyl ether having a precursor group (—SO₂F or the like) for a sulfonic acid group, hydrolyzing the copolymer and converting the precursor group to an acid form.

The perfluorovinyl ether having the precursor group for the sulfonic acid group is preferably a compound (1) below. It is noted that the compound represented by formula (1) is referred to as compound (1) and compounds represented by other formulae are also referred to in the same manner as in the present specification.

$$CF_2=CF(OCF_2CFX)_m-O_p-(CF_2)_n-SO_2F \qquad (1)$$

where m is an integer of from 0 to 3, n is an integer of from 1 to 12, p is 0 or 1, and X is F or CF₃.

The compound (1) is preferably one of the compounds (1-1) to (1-3) below.

$$CF_2=CFO(CF_2)_qSO_2F \qquad (1\text{-}1)$$

$$CF_2=CFOCF_2CF(CF_3)O(CF_2)_rSO_2F \qquad (1\text{-}2)$$

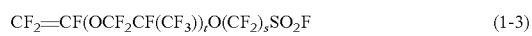

$$CF_2=CF(OCF_2CF(CF_3))_tO(CF_2)_sSO_2F \qquad (1\text{-}3)$$

where each of q, r, and s is independently an integer of from 1 to 8 and t is an integer of from 1 to 3.

The first coating fluid contains the supported catalyst and the ion exchange resin preferably in a proportion of a mass ratio of catalyst carbon:ion exchange resin=from 1.0:0.1 to 1.0:1.6, and particularly preferably in a proportion of a mass ratio of catalyst carbon:ion exchange resin=from 1.0:0.3 to 1.0:1.2 from the viewpoint of the electrical conductivity and the water repellency of the electrodes.

It is noted that the catalyst carbon herein means a mass of the carbon support in the supported catalyst.

By setting the contents of the supported catalyst and ion exchange resin in the above proportion, when in the subsequent gas diffusion layer forming step, the second coating fluid is applied onto the catalyst layer formed with use of the first coating fluid, the ion exchange resin in the second coating fluid penetrates into the catalyst layer and migrates toward the substrate side, so that the catalyst layer has such a structure that the concentration of the ion exchange resin in the catalyst layer becomes higher toward the substrate side. When the catalyst layer is bonded to the electrolyte membrane, the above structure makes the catalyst layer and the membrane more likely to adhere to each other, so as to improve the power generation property of the membrane/electrode assembly.

The first coating fluid can be prepared by mixing the catalyst and the ion exchange resin in a solvent. The solvent may be any solvent that can disperse the catalyst and can disperse or dissolve the ion exchange resin. For example, in a case where the ion exchange resin is a fluorinated ion exchange resin, the solvent is preferably one of alcohols or fluorinated solvents.

Examples of the alcohols include ethanol, n-propanol, isopropanol, n-butanol, isobutanol, tert-butanol, and so on. In order to increase the solubility of the ion exchange resin, a mixed solvent of an alcohol with water may be used.

Examples of the fluorinated solvents include hydrofluorocarbons such as 2H-perfluoropropane, 1H,4H-perfluorobutane, 2H,3H-perfluoropentane, 3H,4H-perfluoro(2-methylpentane), 2H,5H-perfluorohexane, 3H-perfluoro(2-methylpentane), 1,1,1,2,2,3,4,5,5,5-decafluoropentane and 1,1,2,2,3,3,4-heptafluorocyclopentane;

fluorocarbons such as perfluoro(1,2-dimethylcyclobutane), perfluorooctane, perfluoroheptane and perfluorohexane;

hydrochlorofluorocarbons such as 1,1-dichloro-1-fluoroethane, 1,1,1-trifluoro-2,2-dichloroethane, 3,3-dichloro-1,1,1,2,2-pentafluoropropane and 1,3-dichloro-1,1,2,2,3-pentafluoropropane;

fluoroethers such as 1H,4H,4H-perfluoro(3-oxapentane), 3-methoxy-1,1,1,2,3,3-hexafluoropropane, 1,1,1,2,2,3,3,4,4-nonafluorobutyl methyl ether and 1,1,1,2,2,3,3,4,4-nonafluorobutyl ethyl ether; and fluorinated alcohols such as 2,2,2-trifluoroethanol, 2,2,3,3,3-pentafluoro-1-propanol, 1,1,1,3,3,3-hexafluoro-2-propanol and 1,1,1,2,3,3-hexafluorobutanol.

The solid content of the first coating fluid is preferably from 4 to 15 mass % and more preferably from 8 to 12 mass %. When the solid content is set in a range of from 4 to 15 mass %, the coating fluid has an appropriate viscosity and can be uniformly applied, and no crack will be produced in a coated film formed.

The substrate onto which the first coating fluid is applied may be a resin film. Examples of a material for the resin film include non-fluororesins such as polyethylene terephthalate, polyethylene, polypropylene and polyimide; fluororesins such as polytetrafluoroethylene, an ethylene-tetrafluoroethylene copolymer (ETFE), an ethylene-hexafluoropropylene copolymer, a tetrafluoroethylene-perfluoro(alkyl vinyl ether) copolymer and polyvinylidene fluoride; and so on. The substrate may also be one obtained by subjecting the surfaces of these resin films to a surface treatment with a release agent.

There are no particular restrictions on a coating method of the first coating fluid and one of conventionally known methods, e.g., a batch type coating method, a continuous type coating method and so on, can be used.

Examples of the batch type coating method include a bar coater method, a spin coater method, a screen printing method, and so on.

The continuous type coating method can be a post-metered coating method or a pre-metered coating method.

The post-metered coating method is a method of applying an excessive amount of coating fluid and thereafter removing the coating fluid to a predetermined thickness, and examples thereof include an air doctor coater method, a blade coater method, a rod coater method, a knife coater method, a squeeze coater method, an impregnation coater method, a comma coater method and so on. The pre-metered coating method is a method of applying the coating fluid in an amount enough to obtain a predetermined thickness, and examples thereof include a die coater method, a reverse roll coater method, a transfer roll coater method, a gravure coater method, a kiss roll coater method, a cast coater method, a spray coater method, a curtain coater method, a calender coater method, an extrusion coater method and so on.

The coating method preferred is the screen printing method or the die coater method from the viewpoint that the catalyst layer can be formed in a uniform thickness, and the die coater method is more preferable from the viewpoint of production efficiency.

The drying temperature for the coated film is preferably from 70 to 170° C. and more preferably from 80 to 120° C.

The application of the first coating fluid may be conducted in a single step or in multiple steps. When the application is carried out in multiple steps, compositions of the first coating fluid used in the respective application steps may be made different from each other.

The thickness of the catalyst layer is preferably at most 20 μm and more preferably from 1 to 15 μm in view of ease of gas diffusion in the catalyst layer and an improvement in properties of the polymer electrolyte fuel cell. Furthermore, the thickness of the catalyst layer 12 is preferably uniform. As the thickness of the catalyst layer becomes thinner, an amount of the catalyst existing per unit area becomes smaller, which can deteriorate the reaction activity. In that case, the supported catalyst with the metal catalyst supported at a high supporting rate can be used as the electrode catalyst, whereby the reaction activity of the electrode can be maintained at a high level even in the thinner thickness of the catalyst layer, without deficiency of the catalyst amount.

(Gas Diffusion Layer Forming Step)

In this step, the second coating fluid containing the carbon fibers and the ion exchange resin is applied onto the catalyst layer and dried to form the gas diffusion layer. Hereinafter, the gas diffusion layer formed by the gas diffusion layer forming step is referred to as a "carbon fiber layer."

The carbon fibers are preferably those having a fiber diameter of from 0.1 to 50 μm and more preferably from 0.1 to 30 μm from the viewpoint of obtaining a sufficient gas diffusion property in the gas diffusion layer. The carbon fibers may be vapor phase-grown carbon fibers, carbon nanotubes (single-wall, double-wall, multi-wall, cup-stacked-type and so on), chopped fibers, milled fibers, and the like. The vapor phase-grown carbon fibers, chopped fibers or milled fibers are preferable among them.

The fiber length of the carbon fibers is preferably from 5 to 10,000 μm and more preferably from 10 to 6,000 μm from the viewpoint of the dispersibility of carbon fibers in the coating fluid.

Examples of the ion exchange resin in the second coating fluid may be the same as those described for the ion exchange resin in the first coating fluid. Particularly, the fluorinated ion exchange resin is preferable from the viewpoint of enhancing the dispersion of the carbon fibers and increasing the adhesion with the catalyst layer.

The second coating fluid contains the carbon fibers and the ion exchange resin preferably in a mass ratio of carbon fibers: ion exchange resin=from 1:0.03 to 1:1.0, more preferably from 1:0.05 to 1:0.8, particularly preferably from 1:0.1 to 1:0.5. If the ratio of the ion exchange resin is less than carbon fibers:ion exchange resin=1:0.03, the dispersion property of the carbon fibers deteriorates and the adhesion between the carbon fiber layer and the catalyst layer decreases to make them easier to peel off, so as to make handling hard, in the formation of the carbon fiber layer. On the other hand, if the ratio of the ion exchange resin is more than carbon fibers:ion exchange resin=1:1.0, the porosity of the carbon fiber layer becomes smaller to degrade the gas diffusion property and water-removing property.

The second coating fluid preferably further contains a fluorine resin other than the fluorinated ion exchange resin. The water repellency in the carbon fiber layer is further improved thereby. The improvement in the water repellency can avoid suppression of gas diffusion due to clogging of pores in the carbon fiber layer with water produced in the catalyst layer.

The fluorine resin other than the fluorinated ion exchange resin may be a fluorine resin consisting of at least one member from polytetrafluoroethylene, polyvinylidene fluoride, a tetrafluoroethylene-fluoroalkyl vinyl ether copolymer, a fluoroethylene-hexafluoropropylene copolymer and so on, and is particularly preferably polytetrafluoroethylene.

The blending amount of the fluorine resin other than the fluorinated ion exchange resin in the second coating fluid is preferably from 1 to 30% and more preferably from 5 to 20% of the mass of the carbon fibers.

In the present invention, particularly, the second coating fluid preferably contains polytetrafluoroethylene from 1 to 30% and more preferably from 5 to 20% of the mass of the carbon fibers.

The second coating fluid can be prepared in the same manner as the first coating fluid, and may be prepared using the same solvent, solid content and others.

A coating method for applying the second coating fluid onto the catalyst layer can be the same as the coating method of the first coating fluid.

The application of the second coating fluid may be conducted in a single step or in multiple steps. When the application is carried out in multiple steps, compositions of the second coating fluid used in the respective application steps may be made different from each other so that the resulting carbon fiber layer may consist of layers of compositions different in thickness direction and/or planar directions.

For example, after forming a single layer of the carbon fiber layer, another second coating fluid with a different composition is applied onto the carbon fiber layer to form another carbon fiber layer, thereby to form a two-layered structure of carbon fiber layers of compositions different in the thickness direction.

For example, when the carbon fiber layer has such a two-layered structure that carbon fibers with a relatively small fiber diameter is used for the carbon fiber layer (first layer) directly formed on the catalyst layer and that carbon fibers with a relatively large fiber diameter are used for the carbon fiber layer (second layer) formed outside the first layer (on the side opposite to the catalyst layer), we can expect such an effect that water (steam) generated in the catalyst layer during the operation of the fuel cell, quickly moves from the catalyst layer to the first layer, and from the first layer to the second layer by capillary action, thereby to solve the flooding problem during the operation of the fuel cell.

The carbon fiber layer may be comprised of at least three layers.

The thickness of the carbon fiber layer is preferably from 30 to 400 μm, more preferably from 50 to 300 μm, as the total thickness (a distance from the surface adjacent to the catalyst layer to the surface adjacent to the separator, of the carbon fiber layer) in an assembled state as the membrane/electrode assembly in the cell. If the thickness is at least 30 μm, the gas diffusion property and water removal property are improved; if the thickness is at most 400 μm, the membrane/electrode assembly as a whole becomes an appropriate thickness for structural design. The thickness of the carbon fiber layer may be appropriately adjusted by pressing the carbon fiber layer immediately after applied and dried.

A plurality of carbon fibers are entangled with each other to form voids in the carbon fiber layer made by application of carbon fibers as a dispersion. Such voids function as gas channels and the carbon fiber layer thus has excellent gas permeability.

In power generation of the polymer electrolyte fuel cell, water (steam) is generated in the catalyst layer on the cathode side. Such water moves through the gas diffusion layers disposed adjacent to the catalyst layers and is discharged out of the system through the separators.

According to the present invention, the carbon fiber layer is used as the gas diffusion layer adjacent to the separator, whereby the power generation property of the polymer electrolyte fuel cell can be improved.

(Peeling Step)

Next, the substrate is peeled off. This peeling step results in obtaining a laminate of the catalyst layer and the carbon fiber layer. The peeling of the substrate can be carried out by one of conventional peeling methods.

[Step (1-3)]

In this step, the electrolyte membrane 30 is disposed and bonded between the catalyst layer 12 of the anode 10 formed in the above step (1-1) and the catalyst layer 22 of the cathode 20 formed in the step (1-2).

The electrolyte membrane 30 is one containing a proton-conducting polymer, and examples of the proton-conducting polymer may be the same as the above-described ion exchange resins.

The electrolyte membrane 30 may be one of commercially available ion exchange membranes or may be prepared. The electrolyte membrane can be prepared, for example, by forming an electrolyte membrane on a substrate in the same manner as in the above-described catalyst layer forming step except that a coating fluid containing the proton-conducting polymer is used instead of the first coating fluid in the catalyst layer forming step, and peeling the substrate off from the electrolyte membrane.

The thickness of the electrolyte membrane 30 is preferably at most 50 μm, more preferably from 3 to 40 μm, particularly preferably from 5 to 30 μm. When the thickness of the electrolyte membrane 30 is adjusted to at most 50 μm, the electrolyte membrane 30 is unlikely to become dry, which suppresses deterioration of the properties of the polymer electrolyte fuel cell. When the thickness of the electrolyte membrane 30 is adjusted to at least 3 μm, no short circuit occurs.

The bonding of the electrolyte membrane 30 to the catalyst layer 12 of the anode 10 and to the catalyst layer 22 of the cathode 20 can be conducted by hot pressing, thermal roll pressing, ultrasonic fusion or the like, and the hot pressing is preferable from the viewpoint of in-plane uniformity.

The press temperature for the hot pressing is preferably from 100 to 200° C., more preferably from 120 to 150° C. The pressure of the pressing is preferably from 0.3 to 4 MPa, more preferably from 1 to 3 MPa.

The carbon fiber layer of the present invention has such a structure that the ion exchange resin exists more on the substrate side because the ion exchange resin is likely to move together with the solvent toward the substrate side during the application. Therefore, the ion exchange resin exists more on the bonding surface side in the hot pressing process to facilitate adhesion, and the bonding can be conducted at a low press pressure at which the carbon fiber layer is unlikely to be deformed, leading to a good gas diffusion property.

The membrane/electrode assembly 1 obtained as described above can be used for production of the polymer electrolyte fuel cell as it is.

Second Embodiment

In the present embodiment, only the cathode 20 is prepared in the same manner as in the first embodiment, and the catalyst layer 22 of the cathode 20 is bonded to the electrolyte membrane 30.

The anode 10 in the membrane/electrode assembly 1 obtained in the present embodiment has the catalyst layer 12 adjacent to the electrolyte membrane 30 and the ordinary gas diffusion layer, instead of the carbon fiber layer 14, is adjacent to the surface of the catalyst layer which is not adjacent to the electrolyte membrane 30.

Namely, the outermost layer on the cathode 20 side is the carbon fiber layer and the outermost layer on the anode side is the ordinary gas diffusion layer in the membrane/electrode assembly prepared in the present embodiment.

In the present embodiment, a method for forming the anode 10 on the surface of the electrolyte membrane 30 may be, for example, a method wherein the catalyst layer 12 is directly formed on the surface of the electrolyte membrane 30 and wherein the ordinary gas diffusion layer is provided on the surface of the catalyst layer 12 not adjacent to the electrolyte membrane 30, or a method wherein a coating fluid similar to the first coating fluid used in the above catalyst layer forming step is applied onto the ordinary gas diffusion layer to form the catalyst layer 12 and wherein the catalyst layer 12 is bonded to the electrolyte membrane 30.

The method for directly forming the catalyst layer 12 on the surface of the electrolyte membrane 30 may, for example, be a method wherein the catalyst layer 12 is formed on a sheet-like substrate in the same manner as in the above catalyst layer forming step and wherein the catalyst layer 12 is transferred onto the surface of the electrolyte membrane 30, or a method wherein a coating fluid similar to the first coating fluid used in the catalyst layer forming step is applied directly onto the surface of the electrolyte membrane 30 to form the catalyst layer 12.

The method for providing the ordinary gas diffusion layer on the surface of the catalyst layer 12 not adjacent to the electrolyte membrane 30 may be, for example, a method wherein the ordinary gas diffusion layer is disposed on the surface of the catalyst layer 12 not adjacent on the electrolyte membrane 30 and fixed by means of hot pressing, thermal roll pressing, ultrasonic fusion, or the like. The ordinary gas diffusion layer may be a porous conductive material such as commercially available carbon paper, carbon cloth or carbon felt.

It is noted that since there is no resin content on the surface of the commercially available conductive material used as the ordinary gas diffusion layer, the conductive material and the catalyst layer can be temporarily fixed but adhesion between them is not sufficient when the conductive material and the catalyst layer are laid on each other and subjected to hot pressing or the like. Therefore, there is a case where the gas diffusion layer to be used is one obtained by spraying a diluted solution of an ion exchange resin onto the surface of the conductive material. On the other hand, the carbon fiber layer formed in the present invention is excellent in adhesion with the catalyst layer and the forming method thereof is simple. In the present invention, it is sufficient that at least either of the gas diffusion layer of the anode 10 and the gas diffusion layer of the cathode 20 be the carbon fiber layer but it is more preferable that both of the gas diffusion layers be the carbon fiber layers.

Third Embodiment

In the present embodiment, only the anode 10 is prepared in the same manner as in the first embodiment, and the catalyst layer 12 of the anode 10 is bonded to the electrolyte membrane 30.

The present embodiment can be carried out in the same manner as in the second embodiment except that the methods of forming the anode 10 and the cathode 20 are opposite.

In the second embodiment and third embodiment, the ordinary gas diffusion layer is provided on the outermost layer of the membrane/electrode assembly on the side where no carbon fiber layer exists (i.e., on the outermost layer on the anode 10 side in the second embodiment, or on the outermost layer on the cathode 20 side in the third embodiment), but the present invention is by no means restricted to these examples. For example, the anode 10 in the second embodiment may be comprised of only the catalyst layer 12, or the cathode 20 of the third embodiment may be comprised of only the catalyst layer 22. In this case, the catalyst layer is the outermost layer of the membrane/electrode assembly on the side where no carbon fiber layer exists.

In these embodiments, the carbon fiber layer exists in either of the outermost layer on the cathode 20 side and the outermost layer on the anode 10 side and therefore it is not necessarily required to provide the ordinary gas diffusion layer on the outermost layer on the side where no carbon fiber layer exists. However, the gas diffusion layer has such functions as a function of promoting diffusion of gas between the separator and the catalyst layer and a function as a current collector, and it is preferable to also provide the ordinary gas diffusion layer on the outermost layer on the side where no carbon fiber layer exists.

The membrane/electrode assembly prepared by the assembly production process of the present invention is intended to be disposed between two separators each having a gas channel formed on a surface thereof so that the surfaces of the outermost layers are adjacent to the respective separators, thereby to constitute a polymer electrolyte fuel cell.

In the membrane/electrode assembly prepared by the assembly production process of the present invention, at least either of the outermost layer on the anode side and the outermost layer on the cathode side is the carbon fiber layer, and for this reason, the surface of the carbon fiber layer which is not adjacent to the catalyst layer, becomes adjacent to the separator when the assembly is disposed between the two separators as described above.

<<Process for Producing Polymer Electrolyte Fuel Cell>>

In the process for producing the polymer electrolyte fuel cell of the present invention (which will be also referred to hereinafter as a "fuel cell production process of the present invention"), a membrane/electrode assembly comprising an anode and a cathode each having a catalyst layer containing a catalyst and an ion exchange resin, and an electrolyte membrane containing a proton-conducting polymer and disposed between the catalyst layer of the anode and the catalyst layer of the cathode, is disposed between two separators each having a gas channel formed on a surface thereof so that surfaces of outermost layers are adjacent to the respective separators.

In the present invention, the membrane/electrode assembly to be used is a membrane/electrode assembly produced by the assembly production process of the present invention. As described above, at least either of the outermost layers in the membrane/electrode assembly is the carbon fiber layer, and therefore the carbon fiber layer and the separator are adjacent to each other in the polymer electrolyte fuel cell produced by the fuel cell production process of the present invention.

The separators may be separators of various conductive materials such as metal separators, carbon separators and separators of a material obtained by mixing graphite and a resin.

In the polymer electrolyte fuel cell thus obtained, a gas containing oxygen is supplied to the cathode and a gas containing hydrogen is supplied to the anode through the gas channels of the separators, whereby power generation is carried out. Furthermore, the polymer electrolyte fuel cell produced by the present invention can also be applied to a methanol fuel cell in which power generation is carried out by supplying methanol to the anode.

EXAMPLES

Now, the present invention will be described in detail with reference to Examples (Examples 1 to 10, 13 and 14) and Comparative Examples (Examples 11 and 12), but it should be understood that the present invention is by no means restricted to these Examples.

First, a catalyst layer (a) laminate and electrodes (c1) to (c10) to be used in the respective Examples and Comparative Examples were prepared by the following procedures.

[1. Preparation of Catalyst Layer (a) Laminate]

10.0 g of a catalyst (manufactured by Tanaka Kikinzoku Kogyo K.K.) having a platinum/cobalt alloy (platinum:cobalt=46:5 (mass ratio)) supported on a carbon support (specific surface area: 800 $m^2/g$) so as to be contained in a proportion of 51% based on the total mass of the catalyst, was added to 76.0 g of distilled water, and they were stirred. 74.0 g of ethanol was added thereto and they were stirred. 14.0 g of a dispersion liquid having a copolymer (ion exchange capacity: 1.1 meq/g dry resin) (which will be referred to hereinafter as a "copolymer (A)"), obtained by copolymerizing $CF_2=CF_2$ and $CF_2=CFOCF_2CF(CF_3)O(CF_2)_2SO_2F$ and by hydrolyzing the copolymer to convert $-SO_2F$ to $-SO_3H$, dispersed in a mixed solvent with ethanol:water=6:4 and with a solid content of 28 mass % (which will be referred to hereinafter as a "dispersion liquid of copolymer (A)") was added to the foregoing mixture and, the catalyst and the copolymer (A) were further mixed and dispersed therein by a homogenizer to obtain a coating fluid (a-1) for forming a catalyst layer.

Next, the coating fluid (a-1) was applied onto a substrate film made of polypropylene with a die coater, followed by drying in a drier at 80° C. for 30 minutes to prepare a catalyst layer (a). Obtained by this operation was a laminate (a catalyst layer (a) laminate) in which the catalyst layer (a) was laminated on the substrate film.

An amount of platinum per unit area contained in the catalyst layer (a) was calculated by measuring the mass of only the substrate film before forming the catalyst layer (a) and the mass of the substrate film after forming the catalyst layer (a), and it was found to be 0.2 mg/$cm^2$.

[2. Preparation of Coating Fluids (b1,b2 and b3) for Forming Carbon Fiber Layer]

40.9 g of ethanol and 41.9 g of distilled water were added to 20.0 g of carbon fibers and the mixture was mixed and dispersed by a homogenizer. 7.1 g of the dispersion fluid of copolymer (A) prepared above was added thereto and stirred to obtain a coating fluid for forming the carbon fiber layer. A coating fluid (b1) was prepared using milled fibers (tradename: MLD-1000, manufactured by Toray Industries, Inc., fiber diameter: about 7 μm, fiber length: 150 μm) as the carbon fibers, a coating fluid (b2) was prepared using chopped fibers (tradename: K223QG, manufactured by Mitsubishi Chemical Functional Products, Inc., fiber diameter: about 11 μm, fiber length: 6 mm), and a coating fluid (b3) was prepared using carbon fibers (tradename: Besfight MC, manufactured by TOHO TENAX Co., Ltd., fiber diameter: about 7.5 μm) as the carbon fibers.

[3. Preparation of Coating Fluid (b4) for Forming Carbon Fiber Layer]

65.1 g of ethanol and 3.4 g of distilled water were added to 20.0 g of chopped fibers (tradename: K223QG, manufactured by Mitsubishi Chemical Functional Products, Inc., fiber diameter: about 11 μm, fiber length: 6 mm) and they were mixed and dispersed by a homogenizer. 71.4 g of the dispersion liquid of copolymer (A) was added thereto and they were stirred to obtain a coating fluid (b4) for forming a carbon fiber layer.

[4. Preparation of Coating Fluid (b5) for Forming Carbon Fiber Layer]

59.2 g of ethanol and 60.3 g of distilled water were added to 20.0 g of vapor phase-grown carbon fibers (tradename: VGGCF-H, manufactured by Showa Denko K.K., fiber diameter: about 0.15 μm, fiber length: 10 to 20 μm) and they were mixed and dispersed by a homogenizer. 7.1 g of the dispersion liquid of copolymer (A) was added thereto and they were stirred to obtain a coating fluid (b5) for forming a carbon fiber layer.

[5. Preparation of Coating Fluid (b6) for Forming Carbon Fiber Layer]

54.7 g of ethanol, 7.4 g of distilled water and 29.0 g of 1,1,2,2,3,3,4-heptafluorocyclopentane (tradename: ZEORORA-H manufactured by ZEON CORPORATION) were added to 20.0 g of chopped fibers (tradename: K223QG, manufactured by Mitsubishi Chemical Functional Products, Inc., fiber diameter: about 11 μm, fiber length: 6 mm) and 2.0 g of vapor phase-grown carbon fibers (tradename: VGGCF-H, manufactured by Showa Denko K.K., fiber diameter: about 0.15 μm, fiber length: 10 to 20 μm) and they were mixed and dispersed by a homogenizer. 7.9 g of the dispersion liquid of copolymer (A) was added thereto and they were stirred to obtain a coating fluid (b6) for forming a carbon fiber layer.

[6. Preparation of Coating Fluid (b7) for Forming Carbon Fiber Layer]

57.3 g of ethanol, 7.9 g of distilled water, and 30.4 g of 1,1,2,2,3,3,4-heptafluorocyclopentane (tradename: ZEORORA-H manufactured by ZEON CORPORATION) were added to 20.0 g of chopped fibers (tradename: K223QG, manufactured by Mitsubishi Chemical Functional Products, Inc., fiber diameter: about 11 μm, fiber length: 6 mm), 2.0 g of vapor phase-grown carbon fibers (tradename: VGGCF-H, manufactured by Showa Denko K.K., fiber diameter: about 0.15 μm, fiber length: 10 to 20 μm) and 1.1 g of polytetrafluoroethylene fine particles (tradename: SSTD-2 manufactured by Shamrock Company, average particle size: about 5 to 8 μm) and they were mixed and dispersed by a homogenizer. 9.3 g of the dispersion liquid of copolymer (A) was added thereto and they were stirred to obtain a coating fluid (b7) for forming a carbon fiber layer.

[7. Preparation of Electrode (c1)]

The coating fluid (b1) was applied onto the catalyst layer (a) of the catalyst layer (a) laminate prepared in the above step 1, with a die coater so that a dried layer thickness was about 200 μm, followed by drying in a drier at 80° C. for 30 minutes to form a carbon fiber layer (b1). Obtained by this operation was a laminate in which an electrode (c1) composed of the catalyst layer (a) and the carbon fiber layer (b1) was laminated on the substrate film. The substrate film was peeled off from the laminate to obtain the electrode (c1).

[8. Preparation of Electrode (c2-1)]

The coating fluid (b2) was applied onto the catalyst layer (a) of the catalyst layer (a) laminate prepared in the above step 1, with a die coater so that a dried layer thickness was about 200 μm, followed by drying in a drier at 80° C. for 30 minutes to form a carbon fiber layer (b2-1). Obtained by this operation was a laminate in which an electrode (c2-1) composed of the catalyst layer (a) and the carbon fiber layer (b2-1) was laminated on the substrate film. The substrate film was peeled off from the laminate to obtain the electrode (c2-1).

[9. Preparation of Electrode (c2-2)]

The coating fluid (b2) was applied onto the catalyst layer (a) of the catalyst layer (a) laminate prepared in the above step 1, with a die coater so that a dried layer thickness was about 500 μm, followed by drying in a drier at 80° C. for 30 minutes to form a carbon fiber layer (b2-2). Obtained by this operation was a laminate in which an electrode (c2-2) composed of the catalyst layer (a) and the carbon fiber layer (b2-2) was laminated on the substrate film. The substrate film was peeled off from the laminate to obtain the electrode (c2-2).

[10. Preparation of Electrode (c2-3)]

The coating fluid (b4) was applied onto the catalyst layer (a) of the catalyst layer (a) laminate prepared in the above step 1, with a die coater so that a dried layer thickness was about 200 μm, followed by drying in a drier at 80° C. for 30 minutes to form a carbon fiber layer (b2-3). Obtained by this operation was a laminate in which an electrode (c2-3) composed of the catalyst layer (a) and the carbon fiber layer (b2-3) was laminated on the substrate film. The substrate film was peeled off from the laminate to obtain the electrode (c2-3).

[11. Preparation of Electrode (c3)]

A laminate in which an electrode (c3) composed of the catalyst layer (a) and the carbon fiber layer (b3) was laminated on the substrate film was obtained in the same manner as in the above step 7 except that the coating fluid (b3) was used instead of the coating fluid (b1) to form the carbon fiber layer (b3) with a dried layer thickness of about 200 μm. The substrate film was peeled off from the laminate to obtain the electrode (c3).

[12. Preparation of Electrode (c4)]

The coating fluid (b5) was applied onto the catalyst layer (a) of the catalyst layer (a) laminate prepared in the above step 1 so that a dried thickness of the layer containing vapor phase-grown carbon fibers was 10 μm, followed by drying in a drier at 80° C. for 30 minutes. The coating fluid (b1) was applied thereonto with a die coater so that a dried layer thickness was about 200 μm above the substrate film, followed by drying in a drier at 80° C. for 30 minutes to form the carbon fiber layer (b4). Obtained by this operation was a laminate in which an electrode (c4) composed of the catalyst layer (a) and the carbon fiber layer (b4) was laminated on the substrate film. The substrate film was peeled off from the laminate to obtain the electrode (c4).

[13. Preparation of Electrode (c5)]

The coating fluid (b5) was applied onto the catalyst layer (a) of the catalyst layer (a) laminate prepared in the above step 1 so that a dried thickness of the layer containing vapor phase-grown carbon fibers was 10 μm, followed by drying in a drier at 80° C. for 30 minutes. The coating fluid (b2) was applied thereonto with a die coater so that a dried layer thickness was about 200 μm above the substrate film, followed by drying in a drier at 80° C. for 30 minutes to form the carbon fiber layer (b5). Obtained by this operation was a laminate in which an electrode (c5) composed of the catalyst layer (a) and the carbon fiber layer (b5) was laminated on the substrate film. The substrate film was peeled off from the laminate to obtain the electrode (c5).

[14. Preparation of Electrode (c6)]

The coating fluid (b5) was applied onto the catalyst layer (a) of the catalyst layer (a) laminate prepared in the above step 1 so that a dried thickness of the layer containing vapor phase-grown carbon fibers was 10 μm, followed by drying in a drier at 80° C. for 30 minutes. The coating fluid (b7) was applied thereonto with a die coater so that a dried layer thickness was about 200 μm above the substrate film, followed by drying in a drier at 80° C. for 30 minutes to form the carbon fiber layer (b6). Obtained by this operation was a laminate in which an electrode (c6) composed of the catalyst layer (a) and the carbon fiber layer (b6) was laminated on the substrate film. The substrate film was peeled off from the laminate to obtain the electrode (c6).

[15. Preparation of Electrode (c7)]

A laminate in which an electrode (c7) composed of the catalyst layer (a) and the carbon fiber layer (b7) was laminated on the substrate film was obtained in the same manner as in the above step 7 except that the coating fluid (b6) was used instead of the coating fluid (b1) to form the carbon fiber layer (b7) with a dried layer thickness of about 200 μm. The substrate film was peeled off from the laminate to obtain the electrode (c7).

[16. Preparation of Electrode (c8)]

A laminate in which an electrode (c8) composed of the catalyst layer (a) and the carbon fiber layer (b8) was laminated on the substrate film was obtained in the same manner as in the above step 7 except that the coating fluid (b7) was used instead of the coating fluid (b1) to form the carbon fiber layer (b8) with a dried layer thickness of about 200 μm. The substrate film was peeled off from the laminate to obtain the electrode (c8).

[17. Preparation of Electrode (c9)]

The coating fluid (b5) was applied onto the catalyst layer (a) of the catalyst layer (a) laminate prepared in the above step 1 so that a dried thickness of the layer containing vapor phase-grown carbon fibers was 10 μm, followed by drying in a drier at 80° C. for 30 minutes. The coating fluid (b6) was applied thereonto with a die coater so that a dried layer thickness was about 200 μm above the substrate film, followed by drying in a drier at 80° C. for 30 minutes to form the carbon fiber layer (b9). Obtained by this operation was a laminate in which an electrode (c9) composed of the catalyst layer (a) and the carbon fiber layer (b9) was laminated on the substrate film. The substrate film was peeled off from the laminate to obtain the electrode (c9).

[18. Preparation of Electrode (c10)]

The coating fluid (b5) was applied onto the catalyst layer (a) of the catalyst layer (a) laminate prepared in the above step 1 so that a dried thickness of the layer containing vapor phase-grown carbon fibers was 10 μm, followed by drying in a drier at 80° C. for 30 minutes. The coating fluid (b7) was applied thereonto with a die coater so that a dried layer thickness was about 200 μm above the substrate film, followed by drying in a drier at 80° C. for 30 minutes to form the carbon fiber layer (b10). Obtained by this operation was a laminate in which an electrode (c10) composed of the catalyst layer (a) and the carbon fiber layer (b10) was laminated on the substrate film. The substrate film was peeled off from the laminate to obtain the electrode (c10).

Example 1

An ion exchange membrane with a thickness of 30 μm made of a perfluorocarbon polymer having sulfonic acid groups (tradename: FLEMION manufactured by ASAHI GLASS CO., LTD., ion exchange capacity: 1.1 meq/g dry resin), was used as an electrolyte membrane and the electrodes (c1) were used as the anode and the cathode.

The electrodes (c1) were disposed on two respective sides of the electrolyte membrane so that their catalyst layers (a) were in contact with the electrolyte membrane. The laminate was subjected to hot pressing at a press temperature of 130° C. and under a press pressure of 2 MPa to bond the respective catalyst layers of the electrodes (c1) to the electrolyte membrane, thereby to obtain a membrane/electrode assembly with an electrode area of 25 cm$^2$. The membrane/electrode assembly has a structure of carbon fiber layer (b1)/catalyst layer (a)/electrolyte membrane/catalyst layer (a)/carbon fiber layer (b1).

The membrane/electrode assembly thus obtained was set in a cell for power generation with separators each having a channel as shown in FIG. 1 so that the surfaces of the outermost layers of the membrane/electrode assembly were adjacent to the respective separators. Hydrogen (utilization rate: 70%)/air (utilization rate: 40%) were supplied under ambient pressure, and cell voltages at a cell temperature of 80° C. and at current densities of 0.2 A/cm$^2$ and 1.5 A/cm$^2$ at an initial stage of operation were measured. The cell voltages at the initial stage of the operation were measured while supplying hydrogen with a dew point of 80° C. on the anode side and air with a dew point of 80° C. on the cathode side in the cell. Table 1 shows the results.

Example 2-1

A membrane/electrode assembly with an electrode area of 25 cm$^2$ was prepared in the same manner as in Example 1 except that the electrodes (c2-1) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 2-2

A membrane/electrode assembly with an electrode area of 25 cm$^2$ was prepared in the same manner as in Example 1 except that the electrodes (c2-2) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 2-3

A membrane/electrode assembly with an electrode area of 25 cm$^2$ was prepared in the same manner as in Example 1 except that the electrodes (c2-3) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 3

A membrane/electrode assembly with an electrode area of 25 cm$^2$ was prepared in the same manner as in Example 1 except that the electrodes (c3) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 4

A membrane/electrode assembly with an electrode area of 25 cm$^2$ was prepared in the same manner as in Example 1 except that the electrodes (c4) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 5

A membrane/electrode assembly with an electrode area of 25 cm$^2$ was prepared in the same manner as in Example 1 except that the electrodes (c5) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 6

A membrane/electrode assembly with an electrode area of 25 cm$^2$ was prepared in the same manner as in Example 1 except that the electrodes (c6) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 7

A membrane/electrode assembly with an electrode area of 25 cm$^2$ was prepared in the same manner as in Example 1 except that the electrodes (c7) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 8

A membrane/electrode assembly with an electrode area of 25 cm$^2$ was prepared in the same manner as in Example 1 except that the electrodes (c8) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 9

A membrane/electrode assembly with an electrode area of 25 cm² was prepared in the same manner as in Example 1 except that the electrodes (c9) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 10

A membrane/electrode assembly with an electrode area of 25 cm² was prepared in the same manner as in Example 1 except that the electrodes (c10) were used as the cathode and anode instead of the electrodes (c1).

The membrane/electrode assembly thus obtained was set in a cell for power generation in the same manner as in Example 1 and the cell voltages at the initial stage of the operation were measured under the same conditions as in Example 1. Table 1 shows the results.

Example 11

A laminate having a structure of catalyst layer (a)/electrolyte membrane/catalyst layer (a) was prepared by using the same electrolyte membrane as in Example 1 and transferring the catalyst layer (a) of the catalyst layer (a) laminate onto each of two sides of the electrolyte membrane. This laminate was sandwiched between two gas diffusion layers of carbon cloth with a thickness of 350 μm, followed by hot pressing at a press temperature of 130° C. and a press pressure of 2 MPa, thereby to form a membrane/electrode assembly.

The membrane/electrode assembly thus obtained was set in a cell for power generation in the same manner as in Example 1 and the cell voltages at the initial stage of the operation were measured under the same conditions as in Example 1. Table 1 shows the results.

Example 12

The laminate (catalyst layer (a) laminate) in which the catalyst layer (a) was laminated on the substrate film was transferred onto the same gas diffusion layer of carbon cloth with a thickness of 350 μm as in Example 11, by hot pressing at a press temperature of 130° C. and under a press pressure of 3 MPa, thereby to form a laminate having a structure of catalyst layer (a)/gas diffusion layer. A membrane/electrode assembly with an electrode area of 25 cm² and in a structure of gas diffusion layer/catalyst layer (a)/electrolyte membrane/catalyst layer (a)/gas diffusion layer was formed by using the same electrolyte membrane as in Example 1, disposing the catalyst layer (a) of the catalyst layer (a) laminate on each of two sides of the electrolyte membrane so that the catalyst layer (a) was in contact therewith, and conducting hot pressing at a press temperature of 130° C. and under a press pressure of 2 MPa.

The membrane/electrode assembly thus obtained was set in a cell for power generation in the same manner as in Example 1 and the cell voltages at the initial stage of the operation were measured under the same conditions as in Example 1. Table 1 shows the results.

Example 13

The same electrolyte membrane as in Example 1 was used, the electrode (c5) was used as the anode on one side of the electrolyte membrane, and the same catalyst layer (a)/gas diffusion layer as in Example 12 was used as the cathode. The electrodes were disposed on the two respective sides of the electrolyte membrane so that the catalyst layer (a) was in contact with the electrolyte membrane. This laminate was subjected to hot pressing at a press temperature of 130° C. and under a press pressure of 2 MPa to bond the catalyst layers of the electrodes to the electrolyte membrane, thereby to obtain a membrane/electrode assembly with an electrode area of 25 cm². This membrane/electrode assembly had a structure of carbon fiber layer (b5)/catalyst layer (a)/electrolyte membrane/catalyst layer (a)/gas diffusion layer from the anode side.

The membrane/electrode assembly thus obtained was set in a cell for power generation in the same manner as in Example 1 and the cell voltages at the initial stage of the operation were measured under the same conditions as in Example 1. Table 1 shows the results.

Example 14

A membrane/electrode assembly with an electrode area of 25 cm² was prepared in the same manner as in Example 13 except that the structures of the anode and cathode were switched. This membrane/electrode assembly had a structure of gas diffusion layer/catalyst layer (a)/electrolyte membrane/catalyst layer (a)/carbon fiber layer (b5) from the anode side.

The membrane/electrode assembly thus obtained was set in a cell for power generation in the same manner as in Example 1 and the cell voltages at the initial stage of the operation were measured under the same conditions as in Example 1. Table 1 shows the results.

TABLE 1

| Examples | Cell voltage (V) | |
|---|---|---|
| | 0.2 A/cm² | 1.5 A/cm² |
| Example 1 | 0.75 | 0.45 |
| Example 2-1 | 0.75 | 0.46 |
| Example 2-2 | 0.75 | 0.39 |
| Example 2-3 | 0.75 | 0.36 |
| Example 3 | 0.75 | 0.46 |
| Example 4 | 0.76 | 0.46 |
| Example 5 | 0.77 | 0.46 |
| Example 6 | 0.77 | 0.49 |
| Example 7 | 0.75 | 0.46 |
| Example 8 | 0.75 | 0.46 |
| Example 9 | 0.77 | 0.48 |
| Example 10 | 0.77 | 0.49 |
| Example 11 | 0.76 | 0 |
| Example 12 | 0.77 | 0.21 |
| Example 13 | 0.76 | 0.45 |
| Example 14 | 0.76 | 0.46 |

It was confirmed from the results of Table 1 that the polymer electrolyte fuel cells using the membrane/electrode assemblies prepared in Examples 1 to 10, 13 and 14 showed high output voltages in both of the low current density and high current density regions.

On the other hand, Example 11 wherein the gas diffusion layer was formed by hot-pressing the carbon cloth on the catalyst layer instead of the carbon fiber layer and Example 12 wherein the laminate obtained by hot-pressing the catalyst layer on the carbon cloth was used as the electrode, failed to achieve a high output voltage at 1.5 A/cm$^2$.

INDUSTRIAL APPLICABILITY

The present invention enables production of a polymer electrolyte fuel cell capable of obtaining a high output voltage in both of the low current density region and the high output density region.

Therefore, the polymer electrolyte fuel cell produced according to the present invention is very useful in application to various power sources for stationary use, automobile use and so on.

The entire disclosure of Japanese Patent Application No. 2007-024420 filed on Feb. 2, 2007 including the specification, claims, drawing and summary is incorporated herein by reference in its entirety.

What is claimed is:

1. A process for producing a membrane/electrode assembly for a polymer electrolyte fuel cell,
the assembly comprising an anode and a cathode each having a catalyst layer comprising a catalyst and an ion exchange resin, and an electrolyte membrane comprising a proton-conducing polymer and disposed between the catalyst layer of the anode and the catalyst layer of the cathode,
the process comprising forming at least one of the anode and the cathode by:
applying a first coating fluid comprising the catalyst and the ion exchange resin, onto a substrate to form the catalyst layer;
applying a second coating fluid comprising carbon fibers and an ion exchange resin, onto the catalyst layer to form a gas diffusion layer to serve as the outermost layer of the membrane/electrode assembly for the polymer electrolyte fuel cell; and
peeling the substrate off from the catalyst layer.

2. The process for producing the membrane/electrode assembly for the polymer electrolyte fuel cell according to claim 1, wherein the second coating fluid contains the carbon fibers and the ion exchange resin in a mass ratio of the carbon fibers:the ion exchange resin=from 1:0.03 to 1:1.0.

3. The process for producing the membrane/electrode assembly for the polymer electrolyte fuel cell according to claim 1, wherein the gas diffusion layer is so formed as to have a thickness of from 30 to 400 µm.

4. The process for producing the membrane/electrode assembly for the polymer electrolyte fuel cell according to claim 1, wherein the second coating fluid further comprises polytetrafluoroethylene in an amount of from 1 to 30% of a mass of the carbon fibers.

5. The process for producing the membrane/electrode assembly for the polymer electrolyte fuel cell according to claim 1, wherein the carbon fibers have a fiber diameter of from 0.1 to 50 µm.

6. The process for producing the membrane/electrode assembly for the polymer electrolyte fuel cell according to claim 1, wherein both of the anode and the cathode are formed by the said process and wherein the electrolyte membrane is disposed and bonded between the catalyst layer of the anode and the catalyst layer of the cathode.

7. A process for producing a polymer electrolyte fuel cell in which a membrane/electrode assembly comprising an anode and a cathode each having a catalyst layer containing a catalyst and an ion exchange resin, and an electrolyte membrane containing a proton-conducing polymer and disposed between the catalyst layer of the anode and the catalyst layer of the cathode is disposed between two separators each having a gas channel formed on a surface thereof so that surfaces of outermost layers are adjacent to the respective separators, the process comprising forming the membrane/electrode assembly by the process as defined in claim 1, and disposing the gas diffusion layer formed in the gas diffusion layer forming step, so as to be adjacent to the separator.

8. The process for producing the polymer electrolyte fuel cell according to claim 7, wherein the second coating fluid contains the carbon fibers and the ion exchange resin in a mass ratio of the carbon fibers:the ion exchange resin=from 1:0.03 to 1:1.0.

9. The process for producing the polymer electrolyte fuel cell according to claim 7, wherein the gas diffusion layer is so formed as to have a thickness of from 30 to 400 µm.

10. The process for producing the polymer electrolyte fuel cell according to claim 7, wherein the second coating fluid further contains polytetrafluoroethylene in an amount of from 1 to 30% of a mass of the carbon fibers.

11. The process for producing the polymer electrolyte fuel cell according to claim 7, wherein the carbon fibers have a fiber diameter of from 0.1 to 50 µm.

12. The process for producing the polymer electrolyte fuel cell according to claim 7, wherein both of the anode and the cathode are formed through the catalyst layer forming step, the gas diffusion layer forming step and the peeling step, and wherein the electrolyte membrane is disposed and bonded between the catalyst layer of the anode and the catalyst layer of the cathode.

13. The process for producing the membrane/electrode assembly for the polymer electrolyte fuel cell according to claim 1, wherein anode is formed by said process and said catalyst comprises an alloy comprising platinum and ruthenium.

* * * * *